United States Patent [19]
Beehler et al.

[11] Patent Number: 5,344,302
[45] Date of Patent: Sep. 6, 1994

[54] REMOTE IMPRESSION TOOL

[75] Inventors: Edward M. Beehler, Forest; William H. Wolf, Lynchburg, both of Va.

[73] Assignee: B&W Nuclear Service Company, Lynchburg, Va.

[21] Appl. No.: 115,618

[22] Filed: Sep. 3, 1993

[51] Int. Cl.⁵ .............................................. G21C 17/00
[52] U.S. Cl. .................................. 425/178; 425/544; 264/220; 73/105; 376/245
[58] Field of Search ................. 376/245, 463; 425/175, 425/176, 178, 544, 571; 264/220, 259, 275; 73/104, 105; 436/5

[56] References Cited

U.S. PATENT DOCUMENTS

| | | | |
|---|---|---|---|
| 2,601,703 | 7/1952 | Sawyer | 73/104 |
| 3,966,871 | 6/1976 | Schroder | 264/318 |
| 3,978,716 | 9/1976 | Kirschke | 73/86 |
| 3,995,483 | 12/1976 | Hartong et al. | 73/104 |
| 4,198,362 | 4/1980 | Ticker et al. | 73/105 |
| 4,303,608 | 12/1981 | Ticker et al. | 425/178 |
| 4,616,987 | 10/1986 | Boyers et al. | 425/89 |
| 5,058,769 | 10/1991 | Kurtz | 222/47 |

Primary Examiner—Daniel D. Wasil
Attorney, Agent, or Firm—Robert J. Edwards; D. Neil LaHaye

[57] ABSTRACT

A tool for remotely obtaining an impression of a component surface. A support pole is used to position a mold plate having side walls against a component surface. One or more locating guides are provided with seals for sealing off bores in the component surface. A piston from a pneumatic cylinder attached to the support pole is used to force impression material into the space between the mold plate and component surface. An adhesive plate on the mold plate insures removal of the impression with the mold plate once the impression material has hardened. The surface condition of the component may be determined by inspection of the negative impression.

4 Claims, 2 Drawing Sheets

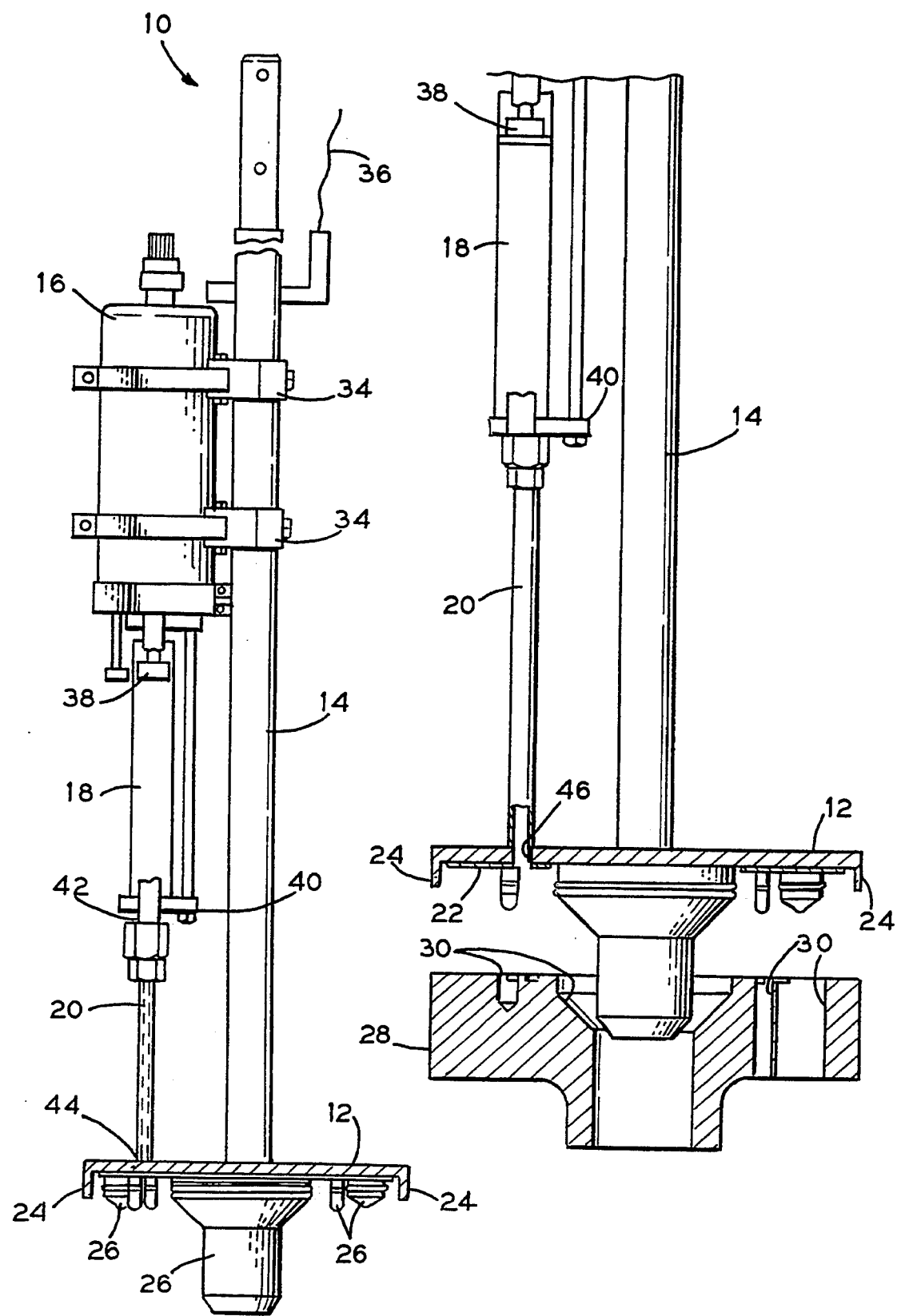

FIG. 3
FIG. 4
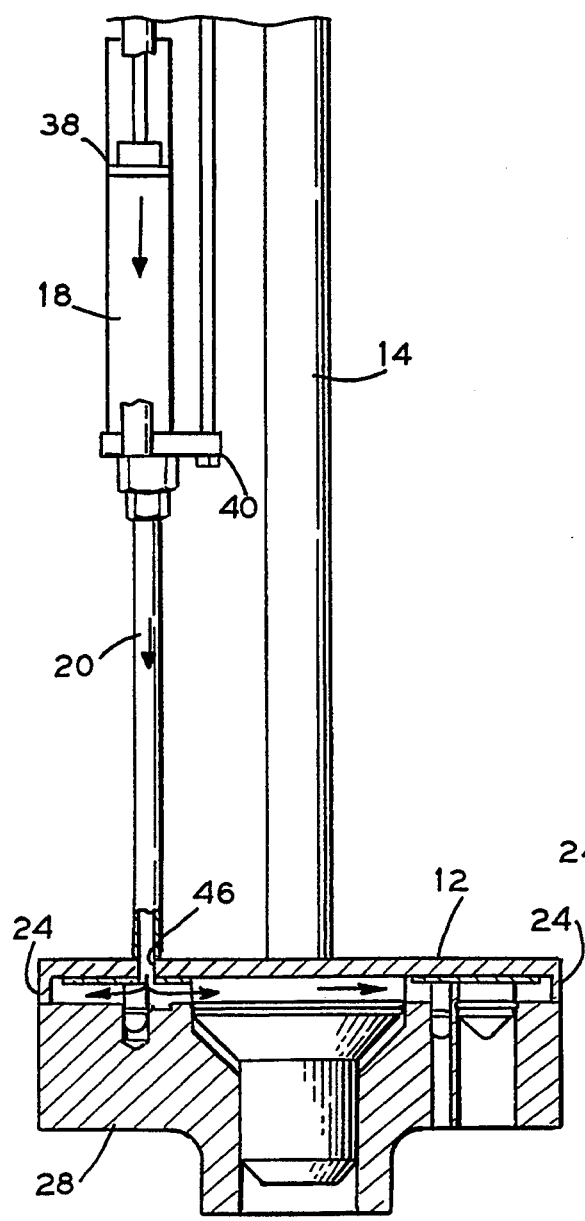
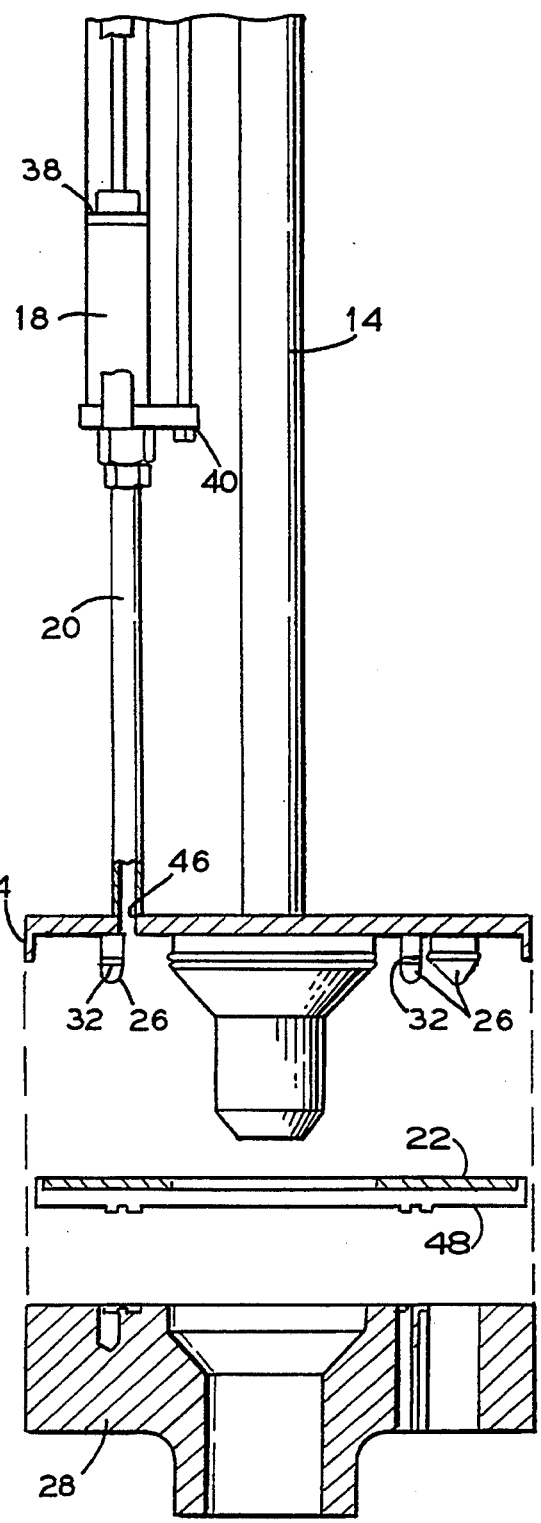

REMOTE IMPRESSION TOOL

BACKGROUND OF THE INVENTION

1. Field of the Invention

The present invention is generally related to the inspection of equipment and particularly to the inspection of equipment not readily accessible to conventional measurement or inspection techniques.

2. General Background

In industrial environments, particularly the nuclear industry, certain equipment is not readily accessible for inspection or damage assessment either due to the physical location of the equipment or the fact that it is radioactive. Patents directed to remote inspection techniques that applicants are aware of include the following.

U.S. Pat. No. 4,303,608 discloses an apparatus for replicating the submerged surfaces of ships. A housing is sealingly engaged with the ship surface. Water is evacuated from the molding region between the ship and the housing. Molding material is forced into the molding region and the device is held in position until the material solidifies.

U.S. Pat. No. 4,198,362 discloses a device where wax or other molding material is caused to contact a surface. A heating element imbedded in the molding material is then used to soften the molding material so that an impression of the surface can be made.

U.S. Pat. No. 3,966,871 is directed to the inspection of internal tubular cavities. An elastically hardenable plastic is cast against the surface and after hardening is pulled from the tubular cavity for inspection.

U.S. Pat. No. 3,995,483 discloses the use of a penetrating liquid dye that is particularly applicable to hot surfaces for making surface defects visible.

U.S. Pat. No. 2,601,703 discloses a method of testing for surface defects where a negative hard plastic cast of the machine elements are made for inspection.

In the nuclear industry, the nature of the equipment and the presence of radioactivity precludes the disassembly of equipment during routine shutdowns for scheduled maintenance and inspection. The control rod drive mechanism (CRDM) of nuclear reactors is subject to steam cut damage on the nozzle flanges and must be inspected on a periodic basis. Video inspection of this equipment provides only gross measurement. The use of liquid penetrant dye subjects personnel to radiation exposure. Precise dimension inspection tools are complex, expensive, require periodic calibration, and the accuracy is often subject to operator skill.

SUMMARY OF THE INVENTION

The present invention addresses the above problems in a straightforward manner. What is provided is a remote impression tool for inspecting components. A mold plate is attached to a support pole to provide remote access to the component to be inspected. A pneumatic cylinder attached to the support pole is in communication with a compressed air source via an air line. A cartridge containing impression material is mounted at the end of the cylinder and receives a piston from the cylinder. The support pole is used to position the mold plate side walls against the component surface to be inspected. One or more locating guides may be provided on the mold plate. Supplying compressed air to the cylinder causes the piston to force impression material from the cartridge into the void between the mold plate and component surface. The tool is removed after the impression material hardens. An adhesive plate on the mold plate removes the impression material from the component surface. The adhesive plate and hardened impression material are then removed from the mold plate. The hardened impression material may then be inspected to determine the condition of the component surface.

BRIEF DESCRIPTION OF THE DRAWINGS

For a further understanding of the nature and objects of the present invention reference should be had to the following description, taken in conjunction with the accompanying drawings in which like parts are given like reference numerals, and wherein:

FIG. 1 is a partial side sectional view of the invention.

FIG. 2 illustrates the invention as it is being moved into position against a component surface to be inspected.

FIG. 3 illustrates the injection of impression material by the invention.

FIG. 4 illustrates the removal of the impression obtained from the component surface.

DETAILED DESCRIPTION OF THE PREFERRED EMBODIMENT

Referring to the drawings, it is seen in FIG. 1 that the invention is generally indicated by the numeral 10. Remote impression tool 10 is generally comprised of mold plate 12, support pole 14, pneumatic cylinder 16, impression material cartridge 18, delivery/mixer tube 20, and adhesive plate 22.

Mold plate 12 may be square or rectangular in plan view and of the suitable size to cover the area of the component being inspected. Components to be inspected may be positioned in a variety of spacial orientations and reference to top and bottom sides of remote impression tool 10 would be inappropriate relative to the components being inspected. Therefore, for ease of reference, mold plate 12 will be referred to as having a support side, the side attached to support pole 14, and an impression side, the side that faces the surface of the component being inspected and of which an impression is being made. As seen in FIGS. 1–4, mold plate 12 is a flat plate having side walls 24 that extend perpendicularly from the edges therefrom to define an enclosure having one open end. One or more locating guides 26 may be provided on the impression side of mold plate 12. A portion of component 28 to be inspected is illustrated in side sectional view in FIGS. 2–4. For purposes of illustration, component 28 is a CRDM nozzle which is subject to steam cut damage during normal nuclear reactor operation conditions. Locating guides 26 are sized and shaped to fit within the recesses or bores 30 in component 28. Locating guides 26 are preferably provided with sealing means 32 to prevent the flow of impression material into bores 30. Sealing means 32 may be formed in any suitable manner, such as by providing O-rings in grooves on locating guides 26.

Support pole 14 is attached to mold plate 12 in any suitable fashion and may be formed from one or more sections to provide sufficient length for reaching component 28.

Pneumatic cylinder 16 is rigidly attached to support pole 16 by means of clamps 34. Air line 36 is in fluid communication with pneumatic cylinder 16. Supplying air to pneumatic cylinder 36 causes piston 38 to extend from a first retracted position seen in FIG. 2 to a second extended position seen in FIG. 4. The end of piston 38 is closely received within impression material cartridge 18.

Impression material cartridge 18 is held in position adjacent one end of pneumatic cylinder 16 by bracket 40. Impression material cartridge 18 may be of any suitable type such as those commercially available to the dental profession. Such cartridges normally have at least two inner chambers to separate the impression material from the hardening agent. The materials are forced into delivery/mixer tube 20. A first end 42 of tube 20 is in fluid communication with cartridge 18. A second end 44 of tube 20 is attached to mold plate 12 in coaxial alignment with bore 46 therethrough, seen in FIGS. 2-4, for delivery of impression material to the impression side of mold plate 12.

Adhesive plate 22 is a thin plate sized to fit within the enclosure defined by side walls 24 and is provided with bores that match the location and size of locating guides 26. Adhesive plate 22 is provided with adhesive on both sides so that it removably adheres to mold plate 12 during operations and adheres to the impression 48 made of the surface of component 28. The adhesion between adhesive plate 22 and impression 48 allows for easy removal of impression 48 from component 28 to an appropriate location for inspection.

In operation, support pole 14 is used to move mold plate 12 into position as seen in FIG. 2, 3 such that side walls 24 contact the surface of component 28. Air pressure supplied through air line 36 to pneumatic cylinder 16 causes movement of piston 38 in cartridge 18. This forces impression material from cartridge 18 through delivery/mixer tube 20 into the space between mold plate 12 and the surface of component 28 as seen in FIG. 3. After the impression material is allowed to harden, support pole 14 is used to remove the mold plate to an appropriate location. Adhesive plate 22 insures that impression 48 is removed with mold plate 12. Impression 48 may then be inspected to determine the surface condition of component 28.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A remote impression tool, comprising:
   a. a support pole;
   b. a mold plate attached to said support pole, said mold plate having side walls that define an enclosure having one open end;
   c. an adhesive plate received on said mold plate in the enclosure defined by the side walls on said mold plate;
   d. a pneumatic cylinder attached to said support pole, said pneumatic cylinder having a piston extending therefrom and being movable between a first retracted position and a second extended position;
   e. an impression material cartridge attached to said pneumatic cylinder and receiving the piston extending from said pneumatic cylinder; and
   f. a delivery tube in fluid communication with said cartridge and the enclosure defined by the side walls on said mold plate.

2. The tool of claim 1, further comprising a locating guide on said mold plate.

3. A tool for remotely obtaining an impression of a component surface, comprising:
   a. a support pole;
   b. a mold plate attached to said support pole, said mold plate having side walls that define an enclosure having gone open end;
   c. a locating guide on said mold plate, said locating guide including means for sealing said locating guide with the component from which an impression is being obtained;
   d. a pneumatic cylinder attached to said support pole, said pneumatic cylinder having a piston extending therefrom and being movable between a first retracted position and a second extended position;
   e. an impression material cartridge attached to said pneumatic cylinder and receiving the piston extending from said pneumatic cylinder; and
   f. a delivery tube in fluid communication with said cartridge and the enclosure defined by the side walls on said mold plate.

4. The tool of claim 3, further comprising an adhesive plate received on said mold plate in the enclosure defined by the side walls on said mold plate.

* * * * *